United States Patent Office 3,394,076
Patented July 23, 1968

3,394,076
METHOD AND APPARATUS FOR THE REGENERATION OF CATALYST IN THE FLUID CATALYTIC CRACKING PROCESS
Dorrance P. Bunn, Jr., and Henry B. Jones, Houston, Tex., assignors to Texaco Inc., New York, N.Y., a corporation of Delaware
Filed Dec. 22, 1966, Ser. No. 603,834
10 Claims. (Cl. 208—164)

ABSTRACT OF THE DISCLOSURE

This invention relates to an improved process and apparatus for effecting the regeneration of catalyst in a fluid catalytic cracking process wherein a hydrocarbon is contacted with a fluidized solid catalyst in a reaction zone effecting conversion of at least a portion of said hydrocarbon to desired conversion products with the concomitant deposition of coke on said catalyst. This invention especially relates to a process and apparatus for regenerating fluidized solids wherein the solids are transported through an elongated reaction flow path. The process and apparatus of this invention achieve this result by inducing a swirling motion in the dense phase bed of a regeneration zone thereby extending the path of particles traversing the regeneration zone and increasing their residence time therein.

Cross reference to related application

The regeneration apparatus and process of this invention may be used in a fluid catalytic cracking system such as that described and claimed by Dorrance P. Bunn, Jr., Henry B. Jones, and Richard E. Nagle in their co-pending U.S. patent application Ser. No. 598,281, filed Dec. 1, 1966, and having the title "Method and Apparatus for Fluid Catalytic Cracking."

Summary of the invention

In fluidized solids reaction vessels, the solids are often introduced itno one section of the vessel and withdrawn from another section of the vessel after having reacted with the gaseous material that also serves as a fluidization medium. The fluidization material is normally introduced into the lower section of the vessel through some type of distributor and withdrawn from the upper portion of the vessel, usually through some device to remove entrained solids material.

While the degree of reaction that takes place between the vapors and solids is frequently a function of such variables as temperature, pressure, and space velocity, it is also important that the inlet solids be contained in the reaction bed for a long enough period of time to permit the reaction to reach the desired degree of completion. This factor is not achieved if the inlet solids pass in a more or less direct route from solids inlet to solids outlet.

In accordance with this invention, the time that the majority of solids particles are in the reaction zone is increased by maximizing the flow path individual particles must traversse from solids inlet to solids outlet. The flow path is lengthened by introduction of the solids into the reaction vessel by means of a tangential inlet to the vessel, and withdrawing the reacted solids from the reaction vessel by means of a suitably shrouded solids withdrawal hopper, located, when viewed in plan in the same half of the vessel as the tangential inlet. By means of this orientation of the inlet and shrouded outlet, plus optional introduction of complementary motion to the gaseous material through suitable design of vapor inlet and outlet, the solids particles may be induced to follow a path from inlet around the periphery of the vessel to the outlet.

Such a device is employed in the regenerator of a fluid catalytic cracking unit as shown in the attached figures and described below.

The present invention relates to an improvement in the regeneration of catalyst in a fluid catalytic cracking process wherein a hydrocarbon is contacted with a fluidized solids catalyst in a reaction zone effecting conversion of at least a portion of the hydrocarbon to desired conversion products with the concomitant deposition of coke on the catalyst. The catalyst with coke deposited thereon is continuously stripped and the stripped catalyst is passed as a dense phase into the dense phase of a regeneration zone wherein catalyst is contacted with an oxygen-containing gas thereby effecting combustion of at least a portion of the coke and regeneration of the catalyst. The regenerated catalyst is continuously withdrawn from the regeneration zone and passed to the reaction zone. In accordance with this invention, a swirling motion is induced in the dense phase bed of the regeneration zone thereby extending the path of particles traversing the regeneration zone. Advantageously, such an extended path is achieved by introducing catalyst as a dense phase into the regeneration zone tangentially thereof and withdrawing regenerated catalyst therefrom at a point circumferentially remote from the point of tangential introduction. The swirling motion may be further enhanced by passing effluent gases and entrained solids leaving the dense phase bed of the regeneration to gas-solids separating means oriented to receive the effluent gases traveling in the direction of the swirling motion without any substantial reversal of direction. Solids separated by the gas-solids separating means are preferably returned to the dense phase bed of the regeneration zone in the direction of the swirling motion. Optionally the oxygen containing regeneration gas may also be introduced into the dense phase of the regeneration zone in the direction of the swirling motion.

An embodiment of the present invention includes apparatus for the regeneration of fluidized solids catalyst which comprises a regeneration chamber adapted to contain a fluidized solids bed in the lower portion thereof, means to withdraw gaseous products of combustion from the regeneration chamber, a dense phase solids input conduit tangentially entering the lower portion of the regeneration chamber, and means to withdraw regenerated catalyst from the regeneration chamber at a point circumferentially remote from the point where the solids input conduit enters the regeneration chamber.

Advantageously, the means to withdraw the catalyst comprises a cylinder in open communication at its top with the interior of the regeneration chamber at a point above the operating level of the fluidized bed therein, the cylinder containing at least one aperture in its lower portion in open communication with the interior of the regeneration chamber at a point below the operating level of the fluidized bed therein, a baffle affixed to the cylinder below the aperture which baffle is inclined upwardly and outwardly, and a cone section depending from the cylinder and extending through the bottom head of the regenerator vessel. Desirably the aperture in the withdrawal means described above is oriented so that it faces away from the dense phase solids input conduit.

In one embodiment of the present invention, means to withdraw gaseous products of combustion comprising an assemblage of cyclone separators is arranged with their input openings facing a path defined by entering the regeneration chamber through the dense phase solids input conduit and continuing about the periphery of the regeneration chamber without reversal of flow. The cyclone separator dip-legs extend from the cyclone separators into the regeneration chamber to a point below the operating level of the fluidized bed therein and discharge in the direction of the defined path.

Means to introduce an oxygen containing gas may comprise a conduit with nozzles opening into the lower portion of the regeneration chamber, which nozzles may be inclined in the direction of the above defined path.

An object of this invention, therefore, is to provide an improved process and apparatus for regenerating a fluid catalyst used in a catalytic cracking process.

Another object of this invention is to improve the efficiency of removing coke from catalytic particles.

A further object of this invention is to lengthen the path taken by particles through the regeneration zone of a fluid catalytic cracking system and thereby to increase the minimum residence period wherein the fluid catalyst particles are in contact with the oxygen-containing regeneration gases without increasing the inventory of catalyst in the regenerator.

The drawings

The invention is further described in conjunction with the following figures which are illustrative of the invention. Obviously modifications may be made within the spirit of the invention as defined in the appended claims.

Detailed description

Figure 1:
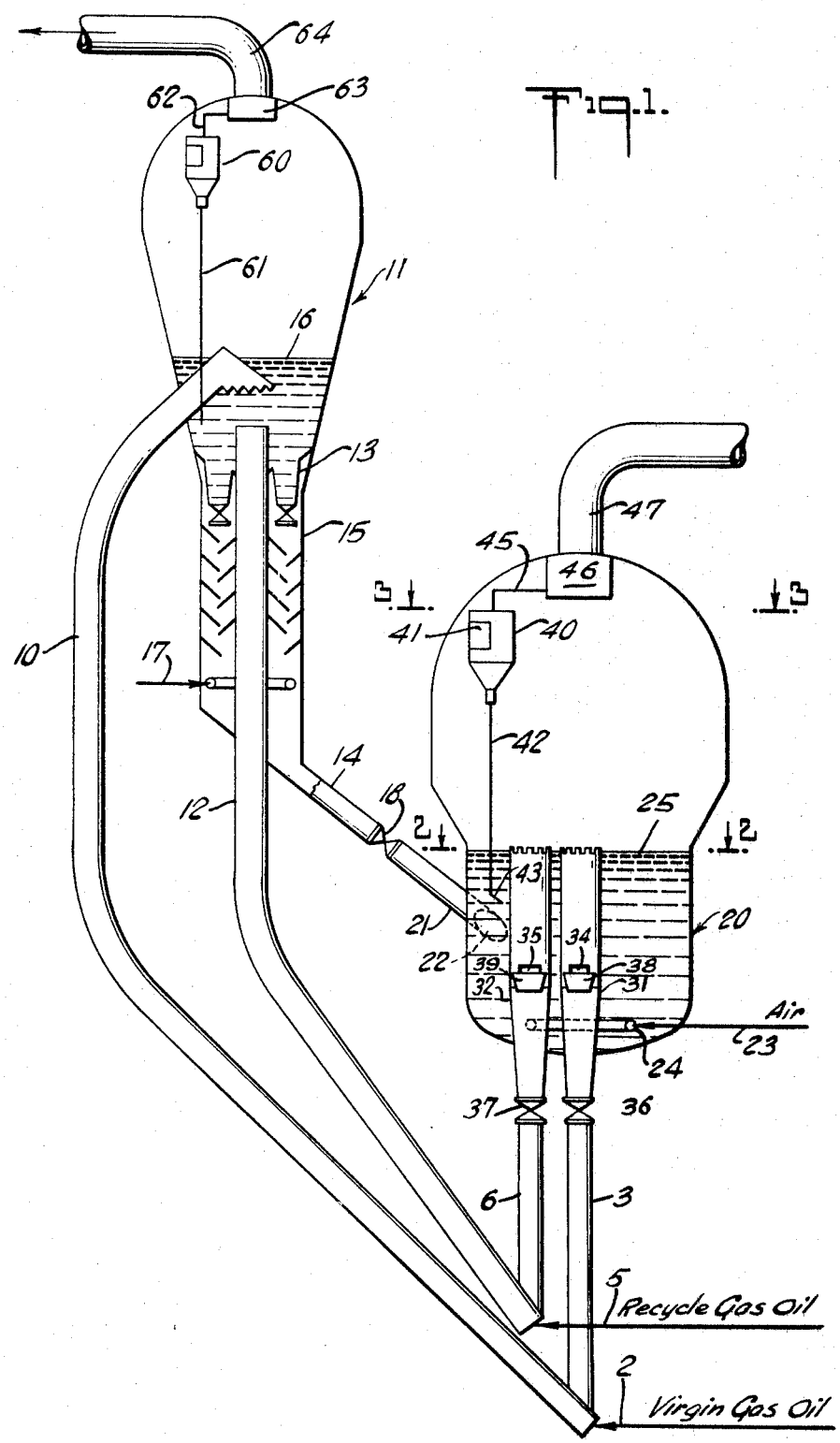
FIGURE 1 is a flow diagram of a fluid catalytic cracking unit showing an arrangement of the reactor and regenerator.

In FIGURE 1, virgin gas-oil in line 2 and regenerated catalyst from line 3 are introduced through a fresh feed riser 10 into reactor 11. A second feed stream in line 5, advantageously a recycle gas-oil, and regenerated catalyst from line 6 are introduced into reactor 11 through recycle feed riser 12. In reaching reactor 11, recycle feed riser 12 passes internally through stripper 15 without being in open communication therewith and extends into the dense phase bed which has a level 16 in the reactor 11. Products of cracking and a small amount of entrained catalyst leave the bed in reactor 11 at level 16 and pass cyclone separator 60 wherein entrained catalyst is separated and returned to the dense phase bed through dip-leg 61. Separated gaseous products are discharged from cyclone 60 through line 62 to plenum 63 which may also collect gaseous products from other cyclone separators not shown. Product vapors from plenum 63 are discharged through product line 64 to fractionation and recovery equipment, not shown.

Figure 2:
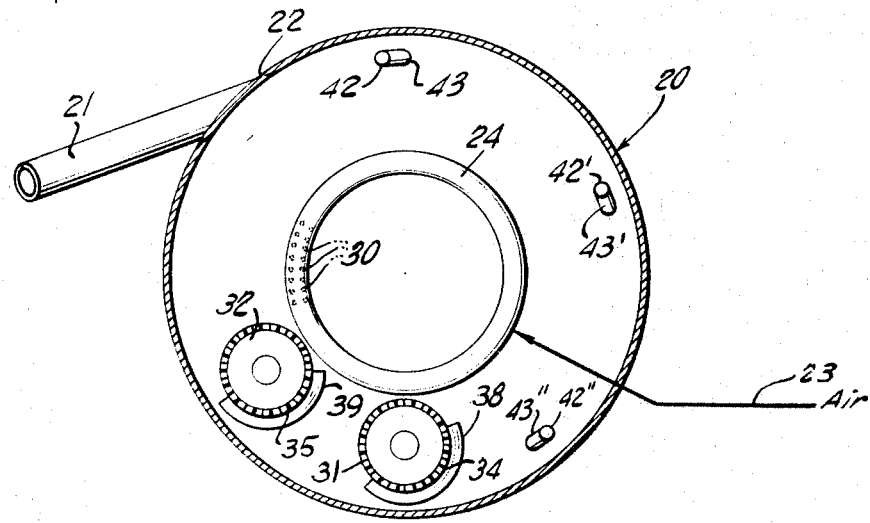
FIGURE 2 is a sectional view taken on line 2—2 of FIGURE 1.
Figure 3:
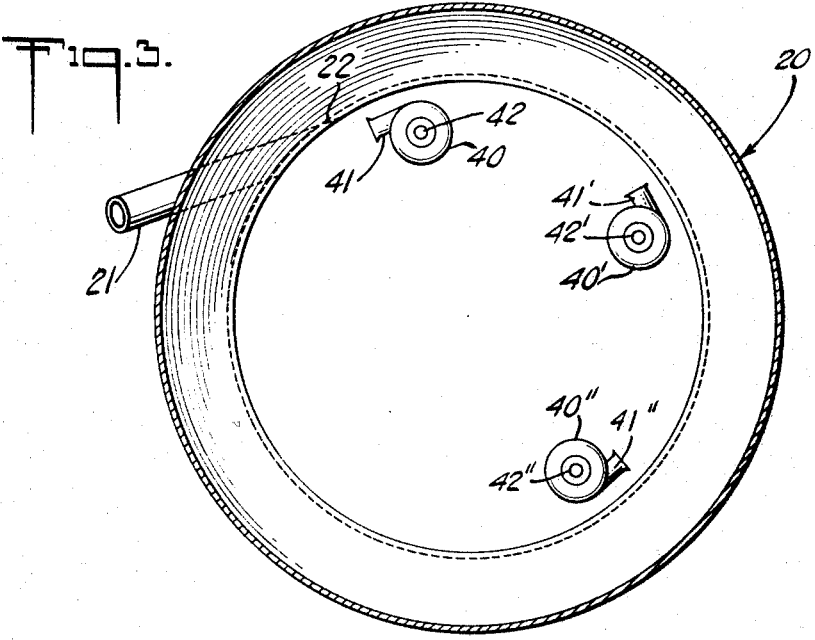
FIGURE 3 is a sectional view taken on line 3—3 of FIGURE 1.

In the course of the catalytic cracking process, coke is deposited on the fluidized solids catalyst. Fluidized solids catalyst is removed from the reactor 11 through standpipe 13, and passed to stripper 15 wherein entrained and occluded hydrocarbons are displaced by stripping steam introduced through steam ring 17. Stripped catalyst from the bottom of stripper 15 is passed through return pipe 14, slide valve 18 and return inlet or inlet conduit 21 into regenerator 20. As shown in FIGURES 1, 2 and 3, spent catalyst return inlet 21 communicates with regenerator 20 through tangential inlet 22 in the lower cylindrical wall of regenerator 20.

A dense phase bed having an upper level 25 is maintained in regenerator 20 and return pipe 21 introduces the used catalyst below level 25. Return pipe 21 introduces the used catalyst as a dense phase directing into the dense phase of regenerator 20 thereby avoiding the localized high temperature which results when oxygen rich air meets high carbon catalyst such as may be encountered in transporting catalyst from a reactor to a regenerator as a suspension in the burning air. Tangential inlet 22 introduces the catalyst particles into the regenerator with a horizontal component of velocity. Since the dense phase bed is confined by the cylindrical wall of vessel 20, a swirling motion is imparted to the particles. Catalyst is withdrawn from regenerator 20 through drawoffs standpipes 31 and 32 which are located circumferentially remote from inlet 22. In this way, catalyst introduced through inlet 22 follows a peripheral path from inlet to outlet. Such a peripheral path is substantially greater than the straight line distance between the inlet and outlet. Thus the path that the catalyst is forced to take is elongated and the catalyst consequently has a longer residence time for the removal of the coke thereon.

Figure 4:
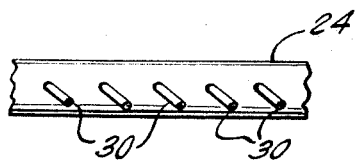
FIGURE 4 is a view of a part of air ring 24 shown in FIGURE 1.

Oxygen containing gas, for example, air, is introduced into regenerator 20 through air line 23, air ring 24 and nozzles 30. Air ring 24 is concentrically aligned in the base of regenerator 20 below dense phase level 25. Nozzles 30 are advantageously spaced about the bottom portion of the air ring 24 or may be inclined in the direction of swirl as shown in FIGURE 4.

The catalyst particles coming through the tangential inlet 22 are suspended in the gas in the regenerator and the resulting suspension exhibits many of the characteristics of a fluid. The coke or carbonaceous material on the catalyst particles is burned away by the oxygen in the regeneration gases.

Catalyst is withdrawn from regenerator 20 through draw-off standpipes 31 and 32. Standpipe 31 communicates through slide valve 36 and standpipe 3 with fresh feed riser 10. Standpipe 32 communicates through slide valve 37 and standpipe 6 with recycle feed riser 12. Draw-off standpipes 31 and 32 are in open communication at their tops with the interior of the regeneration chamber at the top of dense phase 25 of the fluidized bed therein. Preferably, the tops of the draw-off standpipes 31 and 32 are separated whereby the affects of fluctuations in bed level are minimized. Apertures or windows 34 and 35 are provided in the lower portions of draw-off standpipes 31 and 32 respectively. Windows 34 and 35 are located in their respective standpipes so that they occupy less than 180° of the circumference of the standpipe and are preferably located so that they face away from inlet 22, the point where the spent catalyst return pipe 21 enters regeneration chamber 20. In this way, the portion of the respective standpipes behind the windows acts as a shroud tending to prevent bypassing of catalyst directly from the inlet to the outlet standpipe.

In order to funnel a greater amount of catalyst through the windows 34 and 35 as described above baffles or scoops 38 and 39 are affixed respectively to the draw-off standpipes 31 and 32 at the bottom of the windows 34 and 35. These baffles flare upwardly and outwardly from the base of each window 34 and 35 to an elevation somewhat below the top of the windows. These baffles flaring out about the face of the windows serve a dual purpose. In addition to the swirl established in a horizontal plane, a torroidal flow path is induced by the flow of gases into the center of the contacting zone in regenerator 20 which provides a vertical component to the particle motion. Solids separating in the disperse phase of the contacting zone tend to fall downwardly at the walls of the contacting zone. Scoops and 38 and 39 are provided at the bottom of the drawoff hopper windows to receive the downwardly circulating catalyst and direct the descending catalyst into the drawoff hoppers 31 and 32. The scoops 38 and 39, at the same time, deflect rising gases away from the drawoff windows. They serve as a funnel for downwardly traveling catalyst particles, thereby directing a larger and more continuous amount of catalyst particles through the windows. These baffles also deflect the upwardly traveling regeneration gases away from the windows so that they are prevented from entering therein.

Combustion gases leaving the dense phase bed at level 25 and entrained catalyst pass through the disengaging space in the upper portion of regenerator 20 to gas-solids separating cyclone 40 having inlet 41. Cyclone inlet 41 is oriented to receive gases rotating in the same direction as the catalyst particles introduced into regenerator 20 through inlet 22 without reversal of direction. Although, only a single cyclone is shown in FIGURE 1, it will be understood that a plurality of cyclones may be assembled to provide two or more stages of separation and a plurality of single or plural stage assemblies may be employed depending upon the gas handling capacity of the particular cyclone system employed and the total amount of gas to be handled. Solids separated in cyclone 40 are returned to the bed in regenerator 20 by cyclone dip-leg 42. Dip-leg outlet 43 is oriented to direct such returned solids in the direction of swirl of catalyst introduced through tangential inlet 21. Surprisingly, the amount of solids separated from the effluent gases by cyclone 40 may exceed the amount of catalyst circulated from reactor 11 to regenerator 20 through inlet line 21. Typically the catalyst returned through the dip-leg 42 may be about 120 percent of the catalyst circulated through the dense phase inlet line 21, and so the return of this catalyst in the direction of the swirl substantially augments the swirling flow. Gases from cyclone 40 are passed through line 45 to plenum 46 which may also receive effluent gas from other cyclones not shown.

FIGURES 2 and 3 show additional exemplary single stage gas-solids separating cyclones 40' and 40" having inlets 41' and 41" respectively, cyclone dip-legs 42' and 42" respectively and dip-leg outlets 43' and 43" respectively. Gas collected in plenum 46 is discharged through vent line 47 and may be expanded through power generation or heat recovery facilities not shown as is well known in the art.

In an example of this invention, catalyst from a reactor vessel containing a high percentage of carbonaceous material is introduced into the regenerator vessel through a tangential inlet. The tangential inlet induces a clockwise motion to the catalyst. Air is introduced into the vessel at a point below the catalyst inlets. The air passes through the catalyst bed, reacting with the carbonaceous deposits on the catalyst to form carbon dioxide, carbon monoxide, and water vapor. The reaction products leave the dense phase catalyst bed and flow through cyclones, which have the inlets oriented to enhance the clockwise flow. The regenerated catalyst leaves the regenerator vessel through a catalyst withdrawal hopper which is shrouded on the side adjacent the inlet to prevent by-passing of catalyst directly from inlet to outlet.

Exemplary conditions in a fluid catalytic cracking unit regenerator operating as described above are as follows:

| | |
|---|---|
| Regenerator bed temperature, ° F. | 1150 |
| Regenerator top pressure, p.s.i.g. | 20 |
| Spent catalyst to regenerator, tons per minute | 16.5 |
| Entrained catalyst returned by cyclones to regenerator bed, tons per minute | 20 |
| Specific coke burning rate, lb. coke/hr./lb. catalyst | 0.08 |
| Carbon on spent catalyst, wt. percent | 1.0 |
| Carbon on regenerated catalyst, wt. percent | 0.4 |
| Regenerator vessel ID, feet-inches | 20-0 |
| Direct distance from inlet to outlet, feet | 8 |
| Peripheral distance from inlet to outlet, feet | 40 |

It is obvious from the above data, that the peripheral patch dictated by the tangential inlet and shouded withdrawal hopper provides a path twice that which would result if the inlet and outlet were merely on opposite sides of the vessel. Also, the peripheral path is as much as five times the length of the path typically provided in designs which do not provide features to induce a peripheral path. The longer path is desirable to prevent by-passing of partially regenerated (high carbon level) particles to the reactor, where desirable cracking reactions would be suppressed due to the incomplete regeneration.

We claim:
1. In the regeneration of catalyst in a fluid catalytic cracking process wherein a hydrocarbon is contacted with a fluidized solids catalyst in a reaction zone effecting conversion of at least a portion of said hydrocarbon to desired conversion products with the concomitant deposition of coke on said catalyst, said catalyst with coke deposited thereon is continuously stripped, stripped catalyst is passed as a dense phase into the dense phase fluidized bed of a regeneration zone wherein catalyst is contacted with an oxygen containing gas effecting combustion of at least a portion of said coke and regeneration of said catalyst, and regenerated catalyst is continuously withdrawn from said regeneration zone and passed to said reaction zone, the improvement which comprises:

inducing a swirling motion in the dense phase bed of said regeneration zone thereby extending the path of particles traversing said regeneration zone by passing said stripped catalyst as a dense phase tangentially into said regeneration zone.

2. The process of claim 1, wherein regenerated catalyst is withdrawn from said regeneration zone at a point circumferentially remote from the point of tangential introduction of said stripped catalyst.

3. The process of claim 1, wherein effluent gases and entrained solids leaving said dense phase bed of said regeneration zone are passed to gas-solids separating means oriented to receive said effluent gases traveling in the direction of said swirling motion without any substantial reversal of direction.

4. The process of claim 3, wherein solids separated by said gas-solids separating means are returned to said dense phase bed of said regeneration zone in the direction of said swirling motion.

5. The process of claim 1, wherein said oxygen containing gas is introduced into said dense phase of said regeneration zone in the direction of said swirling motion.

6. Apparatus for the regeneration of fluidized solids catalyst which comprises:
a regeneration chamber adapted to contain a fluidized solids bed in the lower portion thereof,
means to introduce an oxygen containing gas into said regeneration chamber,
means to withdraw gaseous products of combustion from said regeneration chamber,
a dense phase solids inlet conduit tangentially entering the lower portion of said regeneration chamber, and
means to withdraw regenerated catalyst from said regeneration chamber at a point circumferentially remote from the point where said solids inlet conduit enters said regeneration chamber.

7. The apparatus of claim 6, wherein said means to withdraw said catalyst comprises:
a cylinder in open communication at its top with the interior of said regeneration chamber at a point above the operating level of said fluidized bed therein, said cylinder containing at least one aperture in its lower portion in open communication with the interior of said regeneration chamber at a point therein,
a baffle affixed to said cylinder below said aperture inclined upwardly and outwardly, and
a cone section depending from said cylinder and extending through the bottom head of said regenerator vessel.

8. The apparatus of claim 7, wherein said aperture is oriented so that it faces away from said dense phase solids inlet conduit.

9. The apparatus of claim 6, wherein said means to withdraw gaseous products of combustion comprises at least one cyclone separator the input opening of which is arranged to face a path defined by entering said regeneration chamber through said dense phase solids input conduit and continuing about the periphery of said regeneration chamber without reversal of flow and the diplegs of which extend from said cyclone separators into said regeneration chamber to a point below the operating level of said fluidized bed therein and discharge in the direction of said path.

10. The apparatus of claim 6, wherein said means to introduce an oxygen containing gas comprises a conduit with nozzles opening into the lower portion of said regeneration chamber said nozzles being inclined in the direction of the path defined by entering said regeneration chamber through said solids inlet conduit and continuing about the periphery of said regeneration chamber.

References Cited
UNITED STATES PATENTS

| | | | |
|---|---|---|---|
| 2,389,399 | 11/1945 | Alther | 252—417 |
| 2,436,927 | 3/1948 | Kassel | 208—164 |
| 2,589,124 | 3/1952 | Packie | 208—164 |
| 2,807,571 | 9/1957 | Murphy et al. | 208—164 |
| 2,902,433 | 9/1959 | Spitz et al. | 208—164 |
| 2,959,537 | 11/1960 | Welty | 208—164 |
| 3,071,538 | 1/1963 | Lawson | 208—164 |

DELBERT E. GANTZ, *Primary Examiner.*

HEBERT LEVINE, *Assistant Examiner.*